235-382
2/23/88 XR 4,727,369

United States Patent [19]

Rode et al.

[11] Patent Number: 4,727,369

[45] Date of Patent: Feb. 23, 1988

[54] ELECTRONIC LOCK AND KEY SYSTEM

[75] Inventors: France Rode, Los Altos; Ali Bologlu, Mountain View, both of Calif.

[73] Assignee: Sielox Systems, Inc., Sunnyvale, Calif.

[21] Appl. No.: 626,040

[22] Filed: Jun. 29, 1984

[51] Int. Cl.[4] .......................... G06F 7/04; G06K 5/00; E05B 49/00

[52] U.S. Cl. ................................ 340/825.31; 235/382; 70/278

[58] Field of Search ....................... 340/825.31, 825.32, 340/825.34, 825.54; 235/380, 382, 382.5; 361/171; 70/278

[56] References Cited

U.S. PATENT DOCUMENTS

| | | | |
|---|---|---|---|
| 3,944,976 | 0/1976 | Rode | 340/146.2 |
| 3,969,584 | 7/1976 | Miller et al. | 340/825.31 |
| 4,196,418 | 4/1980 | Kip et al. | 340/825.31 |
| 4,218,690 | 8/1980 | Ulch et al. | 340/825.31 |
| 4,246,611 | 1/1981 | Davies | 370/101 |
| 4,354,189 | 10/1982 | Lemelson | 340/825.31 |
| 4,388,524 | 0/1983 | Walton | 235/380 |
| 4,415,893 | 11/1983 | Roland et al. | 340/825.31 |
| 4,459,474 | 7/1984 | Walton | 340/825.31 |

*Primary Examiner*—Ulysses Weldon
*Assistant Examiner*—Ralph E. Smith
*Attorney, Agent, or Firm*—Alfred Stapler

[57] ABSTRACT

An electronic security system and an electronic proximity key for use therein are disclosed in which a multi-tiered distributed architecture is used to rapidly and flexibly provide ingress and egress through a plurality of electronic locks. In the event of loss of communication with the central processor, the system will continue to function at lower levels of security without interrupting requests for ingress and egress, and will continue to provide alarm monitor processing. An improved proximity key for actuating the security system is disclosed which includes coupling coils that are integrally formed as part of the integrated circuit lead frame associated with the coding circuitry of such key.

10 Claims, 11 Drawing Figures

LEAD FRAME

ELECTRONIC LOCK AND KEY SYSTEM

FIELD OF THE INVENTION

The present invention is an electronic system of the type wherein a multilevel architecture is provided to permit complete and flexible monitoring and control of a plurality of electronic locks, keys, and alarms.

BACKGROUND OF THE INVENTION

Various types of electronic locks and keys are well known in the art. Rode in U.S. Pat. No. 3,944,976 has shown a security system in which a random bit pattern can be stored and interchanged between an electronic lock and a mating key by either conductive or radiative connections. Kip et al. in U.S. Pat. No. 4,196,418 and Walton in U.S. Pat. No. 4,388,524 have also shown electronic locks and keys that interact via radiative connections. It is desirable to use such an electronic lock and key to provide a complete facility security system that is flexible, has fast response, and is protected from failures of either the AC power or of modules within the system.

SUMMARY OF THE INVENTION

Accordingly, the present invention utilizes a distributed system architecture comprising a master controller connected via a primary two-wire polled communications bus to a plurality of subcontrollers, which subcontrollers are each in turn connected via a secondary two-wire polled communications bus to a plurality of terminal controllers. The master controller provides a central data base station for human interaction to the entire system, program and data entry to the subcontrollers, and recording and archiving of events such as ingress, egress, or the occurrence of alarms on a real-time basis with the assistance of an internal clock. In addition, multiple master controllers can operate together in a cluster mode so that more than one work station can access the entire system. Topologically, the subcontrollers are subordinate to the master controller or controllers and report back to the master controller or controllers any events which are to be stored. The subcontrollers in turn serve as masters over the terminal controllers so that the subcontrollers control and are the decision makers over the terminal controllers, and continuously supervise events that occur on the secondary bus. The terminal controllers in turn provide the necessary interface to various local devices, such as contact closures, alarms, alarm monitors, electronic door locks, and local keypads, as well as communicate back to the subcontrollers events that occur at the local devices.

One feature of the present invention is substantial redundancy in the event of module failures. If the master controller ceases to function or if communication is lost on the primary bus, the subcontrollers remain in control of their related secondary busses and subcontroller decisions continue to be made. However, the ability to download new requirements from the master controller and the report-back capability necessary for central recording and archiving is lost. Similarly, if a subcontroller ceases to function, the terminal controllers can continue to operate their related electronic door locks when stimulated by either a master facility electronic key or a local electronic key or keypad. Furthermore, while in such a downgraded mode the terminal controllers can grant access to their related electronic doors on a selected basis by requiring a particular digit in a particular position in a code field presented by an electronic key or keypad.

A further feature of the present invention is a high degree of flexibility in the access permitted at the individual door locks. Locks can be programmed and reprogrammed to respond to a large variety of factors such as individual names, code numbers, facility codes, department codes, and so forth. In addition, other variables such as access levels, time-of-entry zones, and anti-passback status can be provided or altered as desired for the keys or locks as a function of any one or combination of other factors. The electronic keys can also be programmed and reprogrammed under the control of the master controller or the subcontrollers as the keys are used in the individual locks.

DETAILED DESCRIPTION OF THE INVENTION

Figure 1:
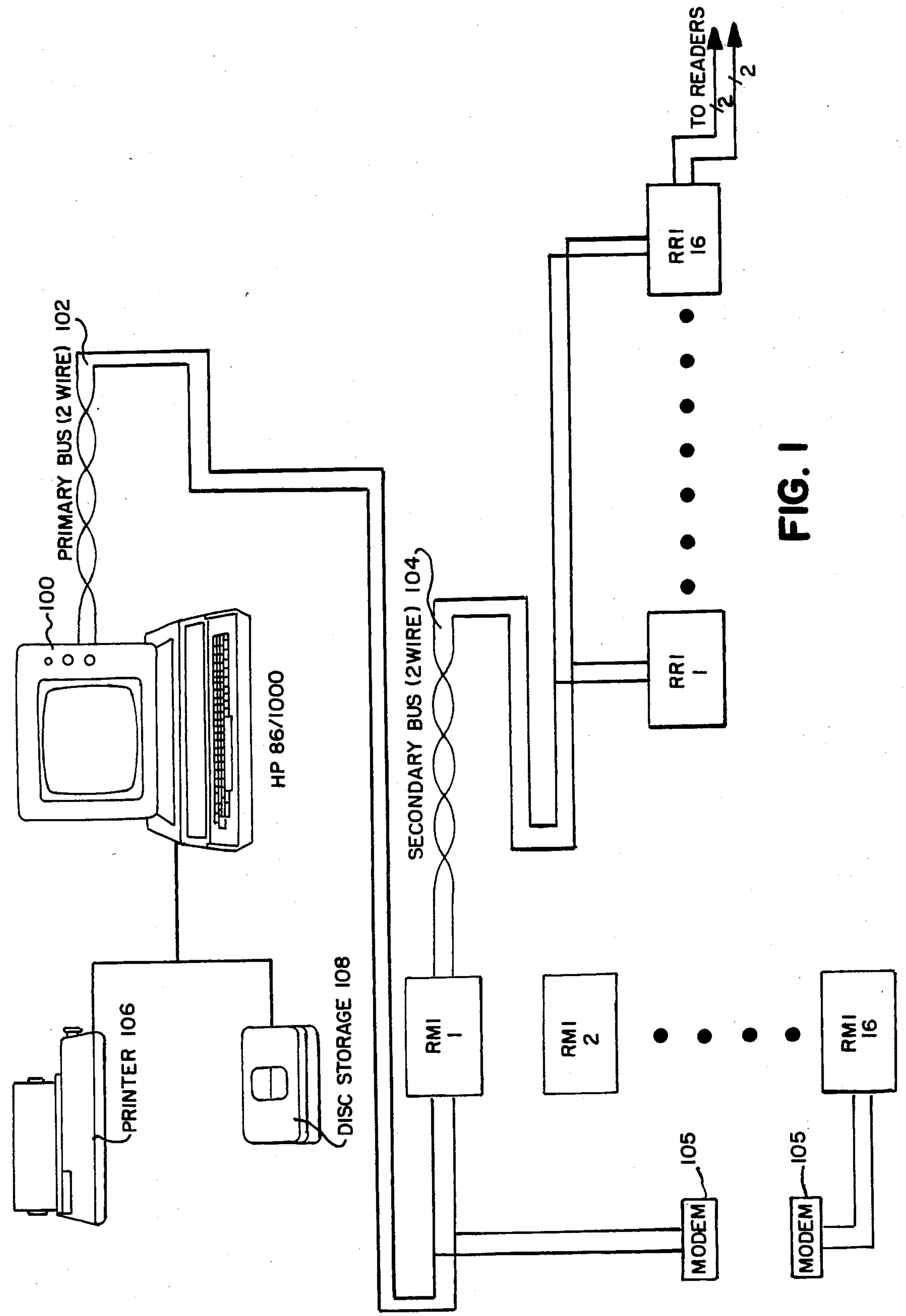
FIG. 1 shows an overall block diagram of the preferred embodiment of the present invention.

FIG. 1 shows a block diagram of an electronic lock, key and alarm system according to the present invention. A master controller 100 is connected via a two-wire primary bus 102 to a plurality of subcontrollers RMI1–RMI16, and each of the subcontrollers RMI1–RMI16 are in turn connected via a two-wire secondary bus 104 to a plurality of terminal controllers RRI1–RRI16. The primary and secondary busses 102 and 104 can be up to 4000 feet long, and can be extended as desired using telephone lines along with modems 105. The master controller 100 is a conventional computer such as an HP-86/1000 manufactured by the Hewlett-Packard Co. of Palo Alto, California. The master controller 100 is also connected to various peripheral devices such as a printer 106 and a disc storage unit 108. The master controller 100 provides the human interface to the entire system, and once the system is operational, the master controller 100 records and stores all activity in the system on the printer 106 and the disc storage unit 108. A human operator uses the master controller 100 to enter various multi-level passwords and codes, such as access levels, time codes, and anti-passback status (i.e., permission to pass through a lock only once) into the system as desired, after which these passwords and codes are downloaded first as required to the subcontrollers RMI1–RMI16 and then as required to the terminal controllers RRI1–RRI16. Thus, assuming for example that there are "m" number of access levels and "n" number of time intervals assigned to each terminal controller RRI, as the number of terminal controllers RRI increases the total complexity of the system is directly proportional to the product of m times n times the number of terminal controllers RRI. The passwords and codes can be programmed to identify employees by name as well as by number, and a number of other factors including department, title, phone extension and the like. The operator can also identify various devices by name, such as "lobby door" or "computer room smoke detector". In addition, the master controller 100 has a real time clock (not shown) so that events can be recorded along with their actual time of occurrence.

Figure 2A:
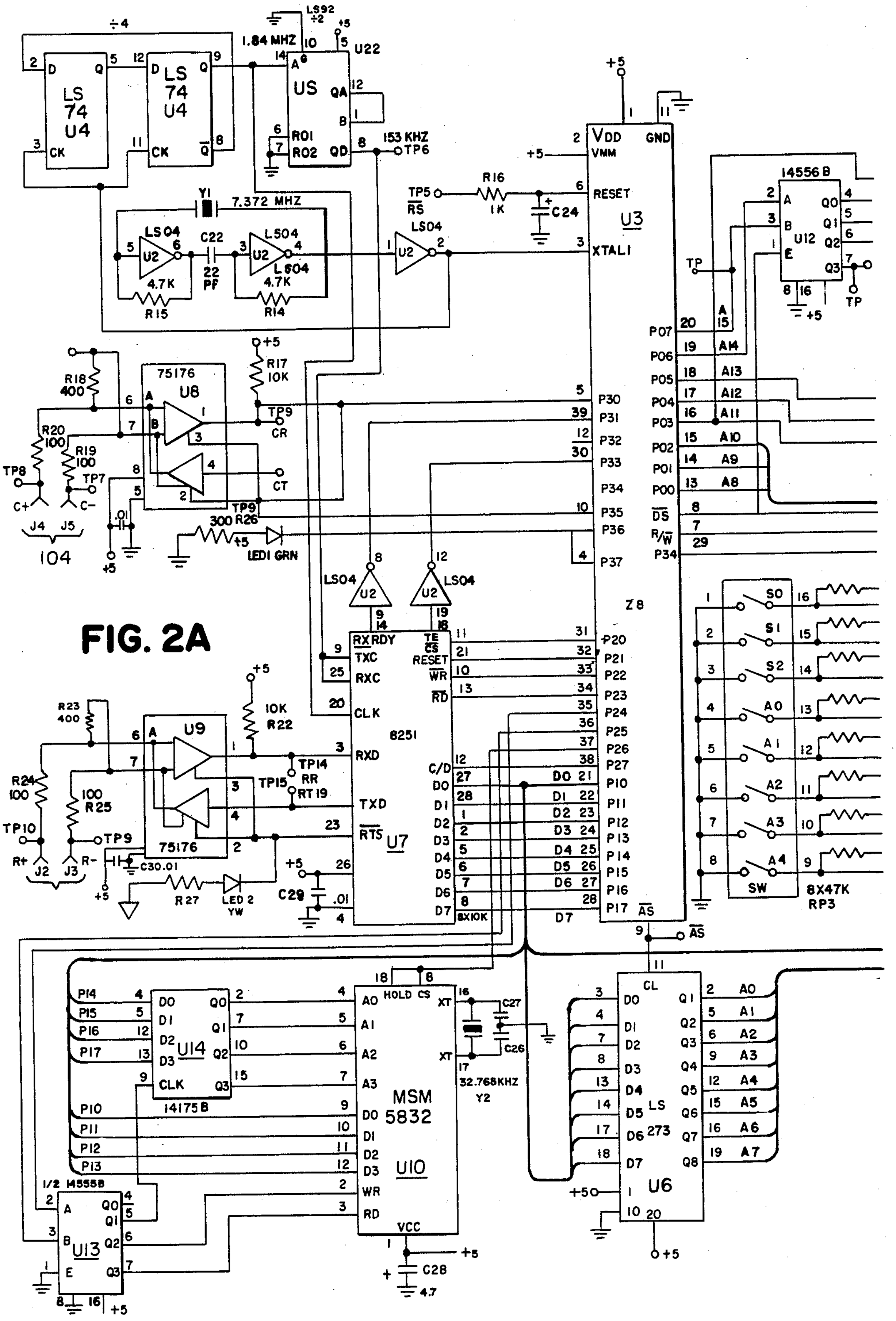
FIG. 2 is a detailed schematic diagram of a subcontroller as shown in FIG. 1.
Figure 2B:
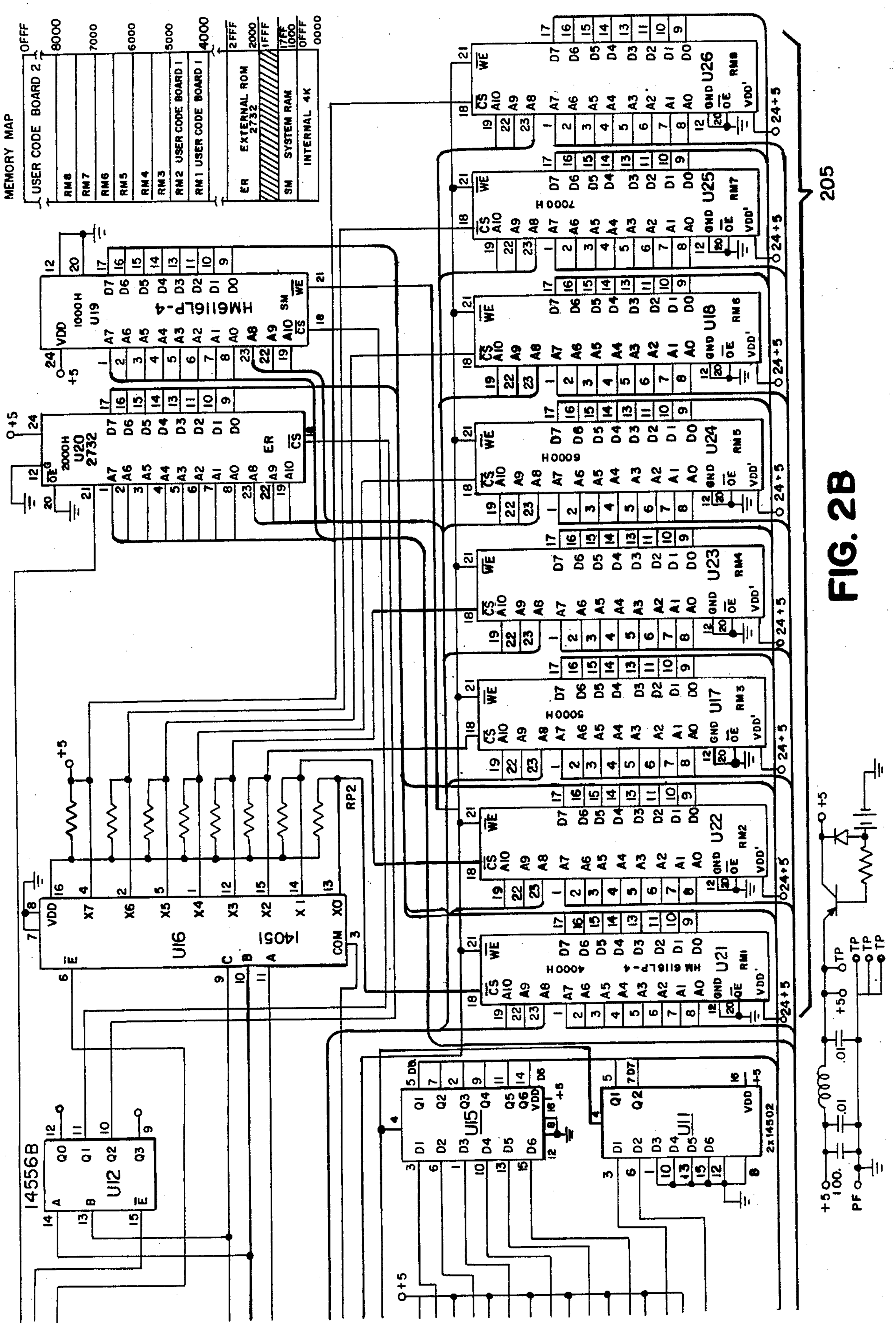

The subcontrollers RMI1–RMI16 as shown in FIG. 2 form the heart of the system's distributed decision-making architecture. Via the secondary busses 104, the subcontrollers RMI1–RMI16 control a plurality of door locks, granting or denying access while independently reporting all system activities back to the master controller 100 on the primary bus 102 for report generation or sounding of an alarm. The subcontrollers' activity is totally independent of the master controller 100 except for historical data storage and retrieval. The subcontrollers RMI1–RMI16 each contain a microprocessor 200 along with sufficient memory 205 to store several thousand individual card and/or keypad codes with their assigned access levels, time codes, and other operational parameters received from the master controller 100 on the primary bus 102.

Figure 4A:
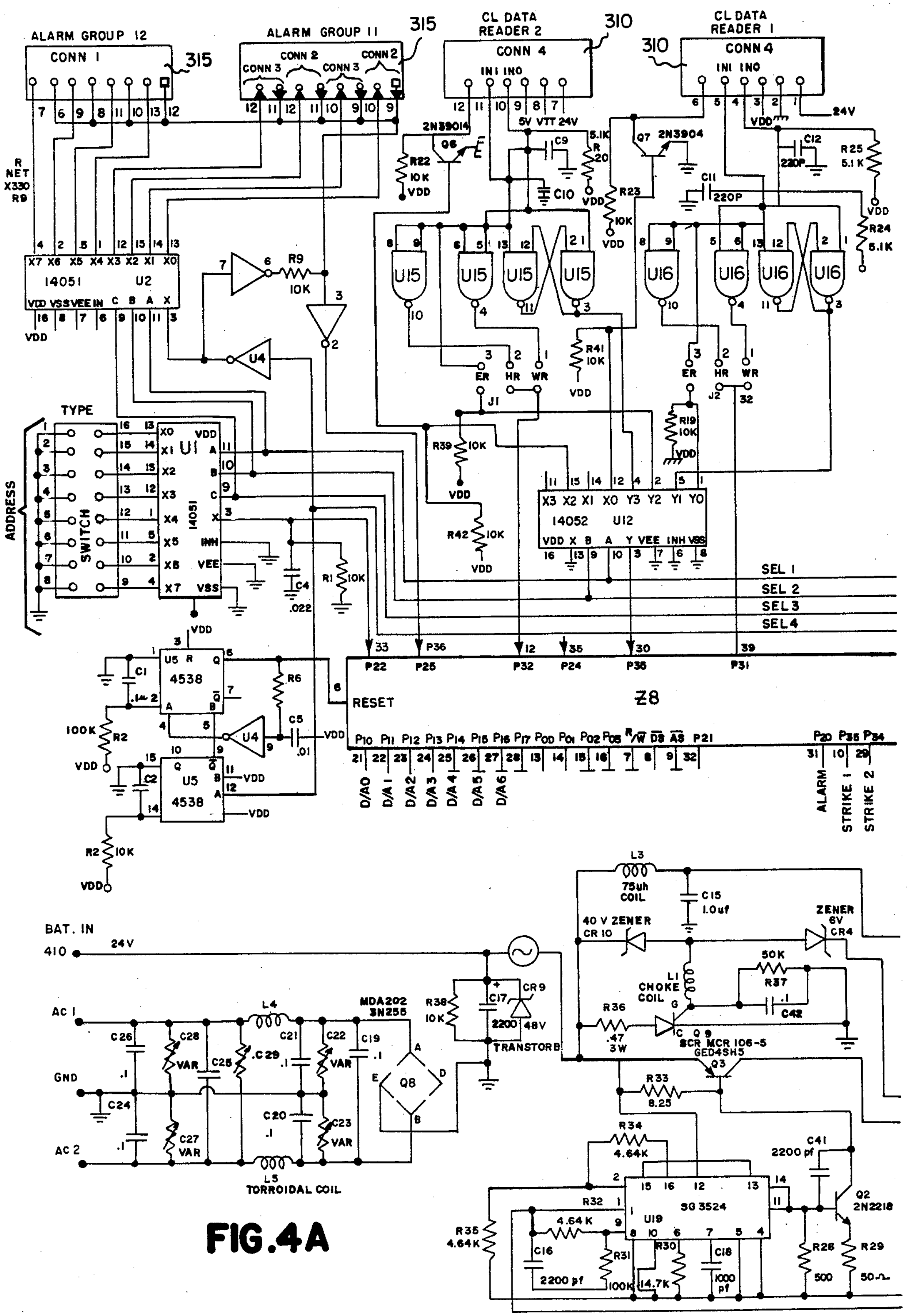
FIG. 4 is a detailed schematic diagram of a terminal controller as shown in FIG. 3.
Figure 4B:
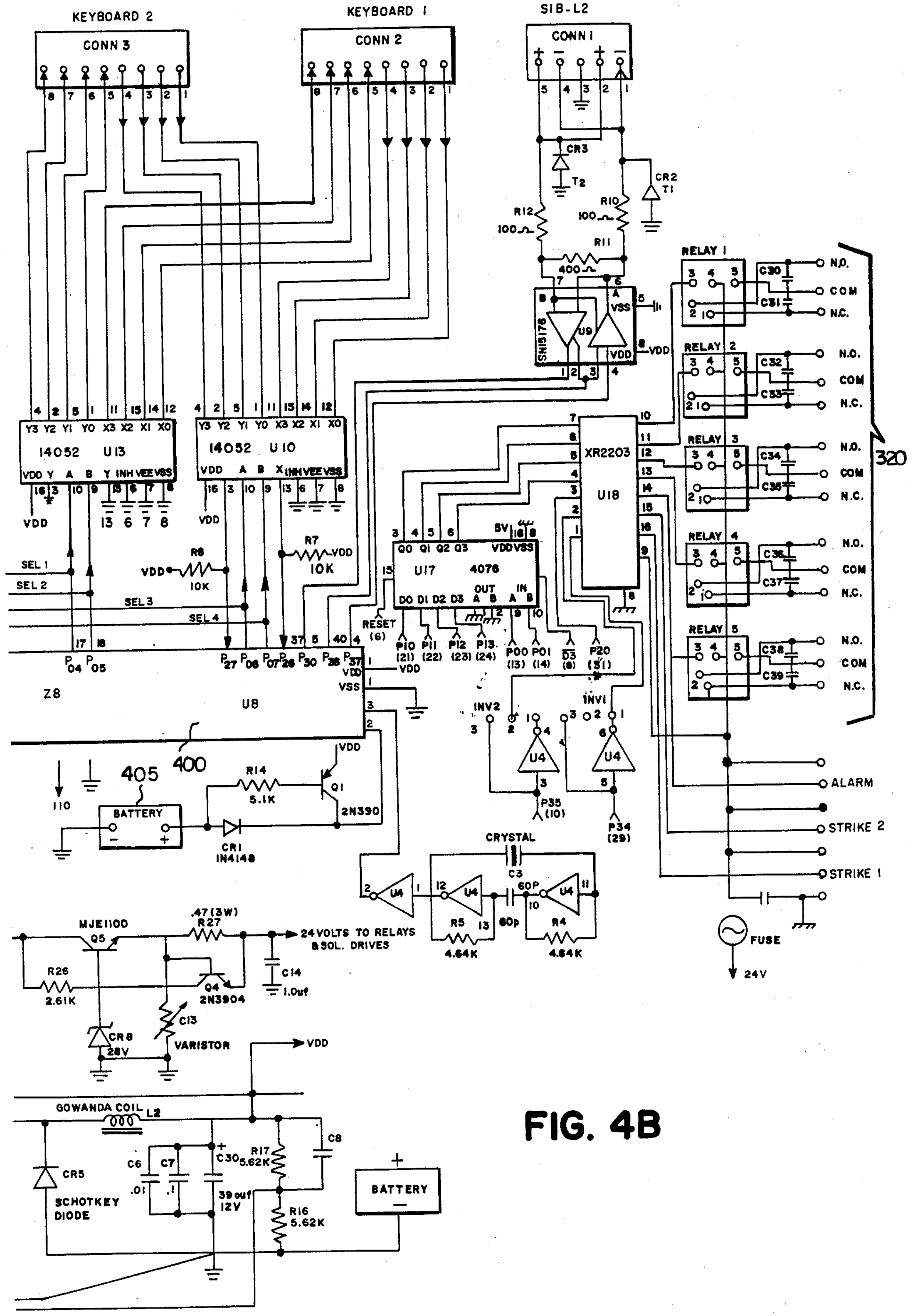
Figure 3:
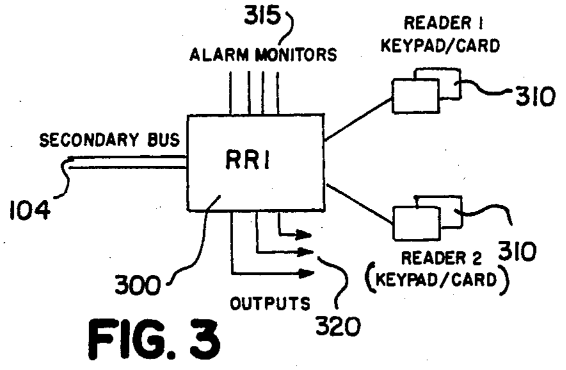
FIG. 3 is a block diagram of a terminal controller as shown in FIG. 1.

Each of the subcontrollers RMI1–RMI16 is connected to several terminal controllers RRI1–RRI16 as shown in FIGS. 3 and 4. The terminal controllers RRI-1–RRI16 are the entry points where codes are presented, and where entry is actually controlled. Each terminal controller 300 accepts several card readers and/or keypads 310 and provides several door alarm monitors 315 and lock outputs 320. Code entry is obtained using a keypad, card, or for dual verification, both keypad and card entry. As in the case of the primary bus 102, the secondary bus 104 can be up to 4000 feet long and may be extended as needed through the use of telephone modems (not shown). As shown in FIG. 4, each terminal controller 300 contains its own microprocessor 400 so that access requests can be processed locally and rapidly without having to communicate via the secondary bus 104. In addition, each terminal controller 300 has its own batteries 405 and 410 so that in the event of a power failure or subcontroller failure an access code entered on the card readers and/or keypads 310 can still operate the local related entry ways. Furthermore, in the event of such a subcontroller failure, for a code field consisting of four serial digits in the order A1, A2, B1, and B2 entered via the card readers or keypads 310, if one of the serial digits (e.g., B1) has a particular preselected value (e.g., "4"), then the terminal controllers 300 will permit access whenever the code xx4x is entered, where "x" is any entered value.

Figure 5:
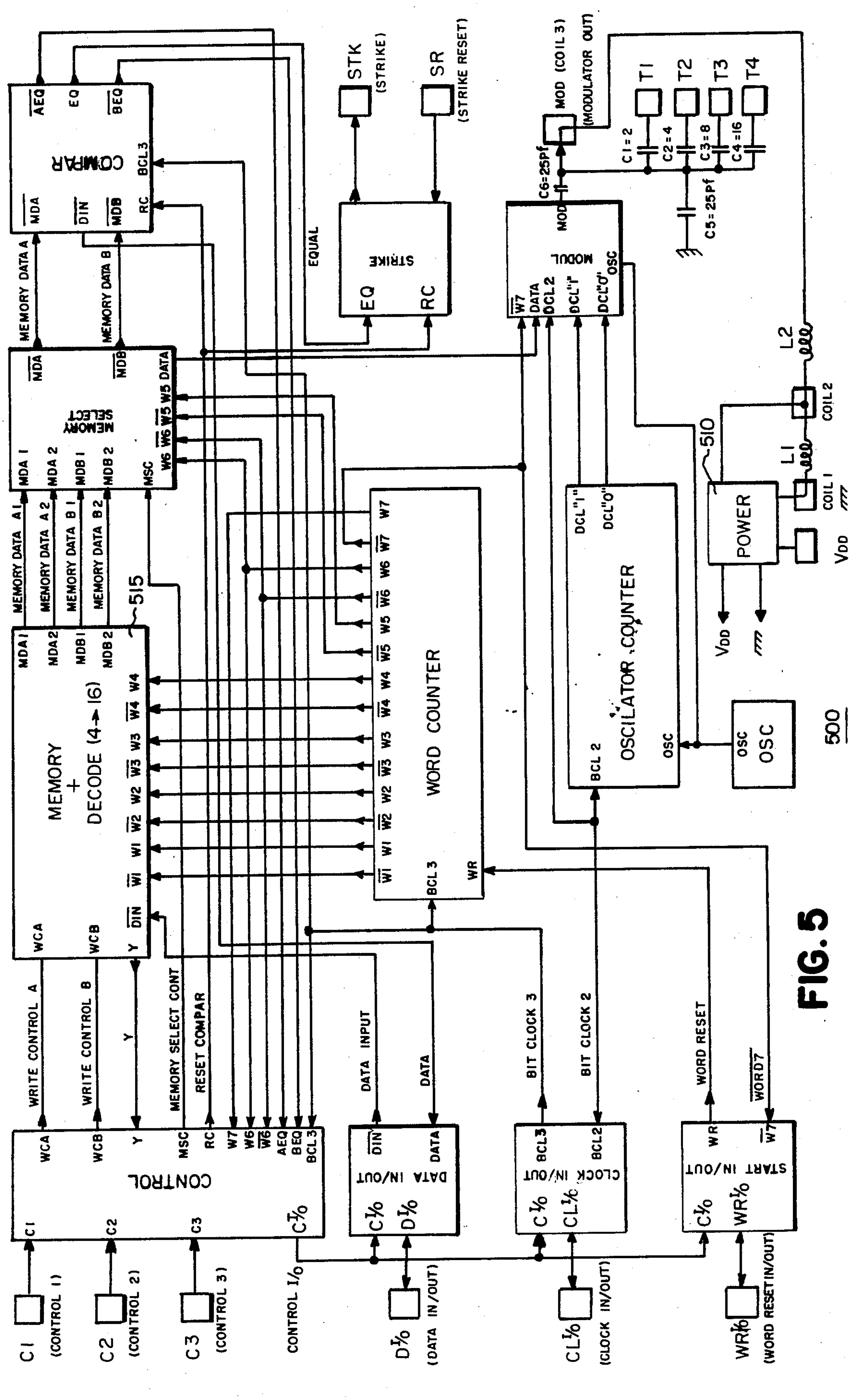
FIG. 5 is a block diagram of an electronic key for use with a terminal controller as shown in FIG. 3.
Figure 6A:
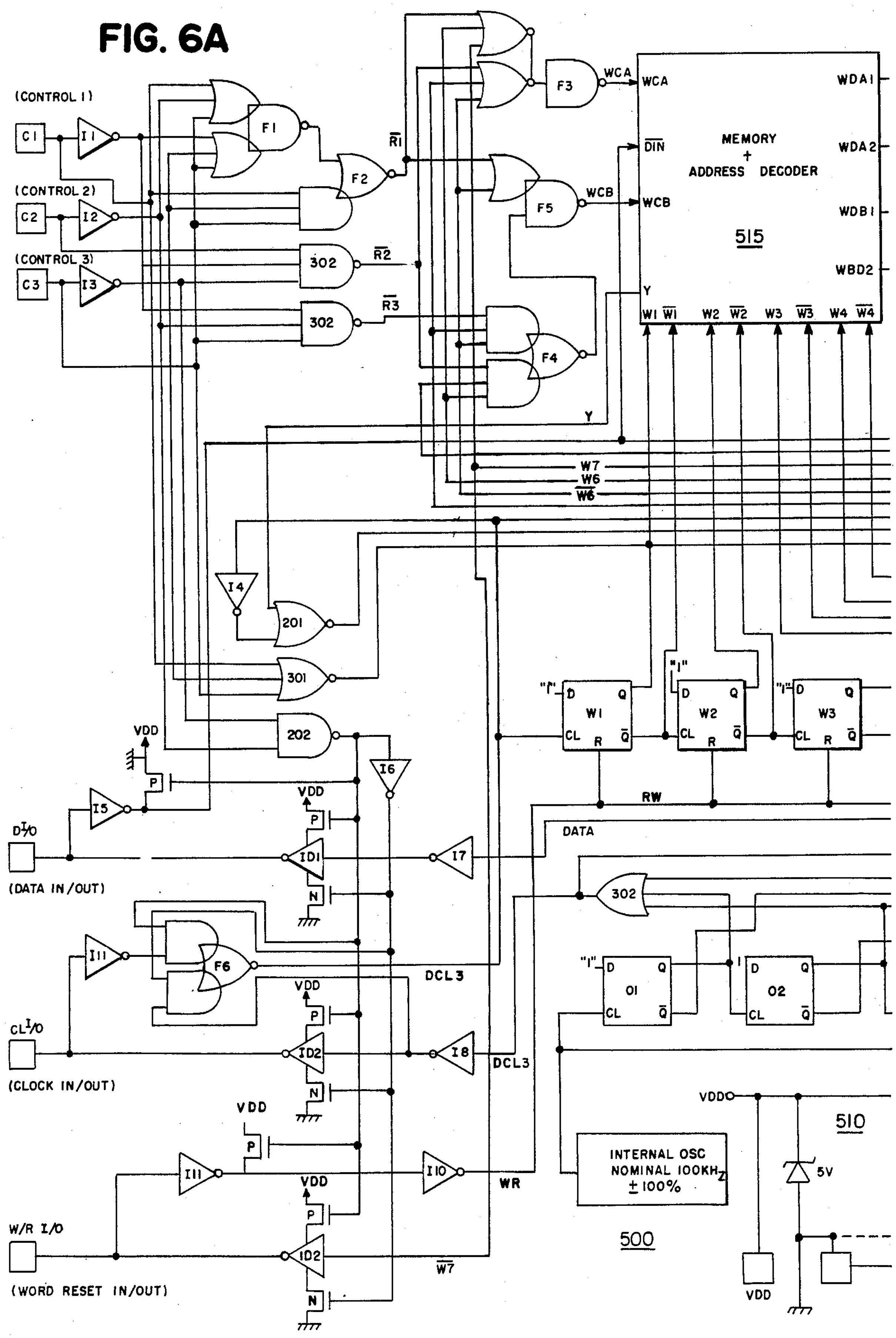
FIG. 6 is a detailed schematic diagram of an electronic key as shown is FIG. 5.
Figure 6B:
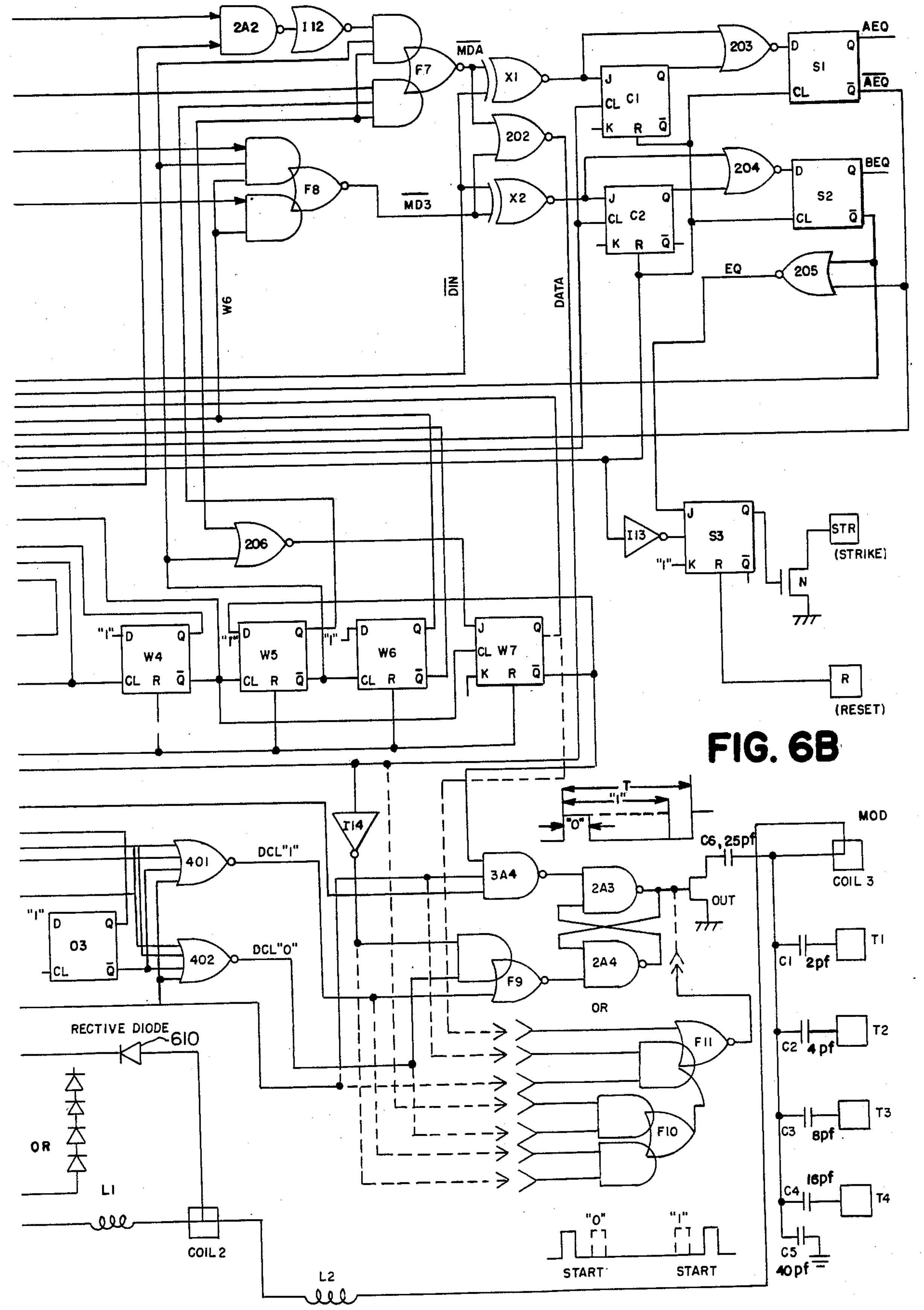
Figure 7:
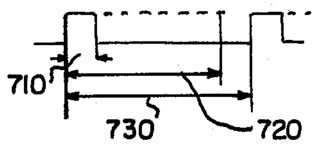
FIG. 7 is a timing diagram of the modulation scheme used in the present invention.
Figure 8:
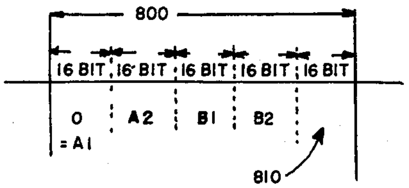
FIG. 8 is a timing diagram of the data sequence used by the electronic key as shown in FIGS. 5 and 6.

FIGS. 5 and 6 show the block diagram and detailed schematic respectively of a radio frequency-coupled proximity key 500 for use in the preferred embodiment of the present invention. Frequency tuning is performed by connecting one or more of the terminals T1–T4 to ground prior to use of the key 500. A read operation is performed by coupling radio frequency (RF) energy into the key 500 from the reader 310 via coils L1 and L2, which are molded into the structure in which the circuitry of FIG. 6 is mounted. When rectifier 610 within power circuitry 510 generates more than three volts on terminal VDD, the key 500 produces a modulated signal on coils L1 and L2 corresponding to the data stored in a non-volatile memory 515 such as sixty-four bits of electrically alterable read only memory (i.e., EEROM) or fusible link read only memory (i.e., PROM). The modulation scheme used is shown in FIG. 7, where a binary zero is produced by a short pulse 710 of 20 microseconds and a binary one is produced by a long pulse 720 of 140 microseconds during each total bit time 730 of 160 microseconds. Alternatively, as illustratd in FIG. 6, the modulation scheme may use two very short pulses within each bit time 730, where the first such short pulse identifies the "START" of the bit time 730 and the second such short pulse occurs either at a brief period later to designate a "0" bit, or at a longer period later to designate a "1" bit. As shown in FIG. 8, each modulated output cycle 800 is in turn composed of five 16-bit subcycles: A1=0, A2, B1, B2, and a 16-bit timing gap 810 during which no modulation occurs to provide synchronization information for use by the terminal controllers 300. The modulated output cycle 800 is repeated over and over as long as VDD is above three volts.

The key 500 is reprogrammed either in the factory or in the local readers by entering signals on the data line DIO, clock line CLIO, word reset line WRIO, and on the control line C3. If, for example, the code already stored on the key 500 is A1, A2, B1, and B2, and a new input data sequence is X1, X2, X3, X4, then if X1=A1 and X2=A2, X3 replaces B1 and X4 replaces B2. In order to prevent unauthorized key use or alteration, A1 and A2 are permanently programmed during production of the key 500 by connecting control line C2 to ground, and B1 and B2 cannot be changed unless X1=A1 and X2=A2. As a further protective measure, it should be noted that when the key 500 is actually used, A1 produced by the key is always zero so that the entire keycode cannot be read out from the key 500 itself and, therefore, A1 serves as a secure master facility code for key programming, A2 serves as a master facility code for access, and B1 and B2 can then be assigned as individual user codes.

Figure 9A:
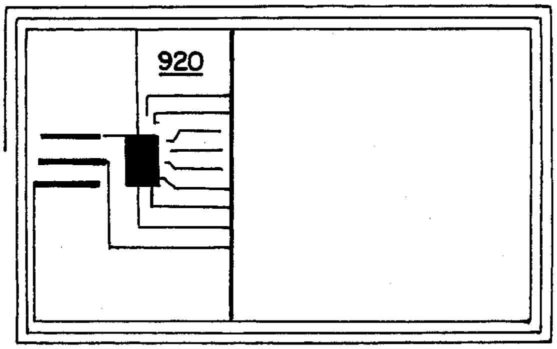
FIGS. 9A, 9B and 9C illustrate the structures of the lead frame in progressive stages of building the electronic key as shown in FIGS. 5 and 6.
Figure 9B:
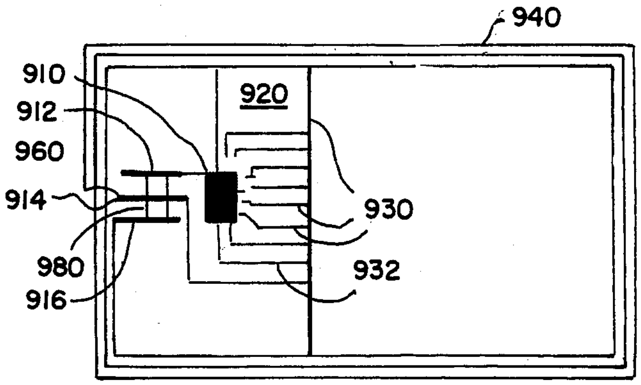
Figure 9C:
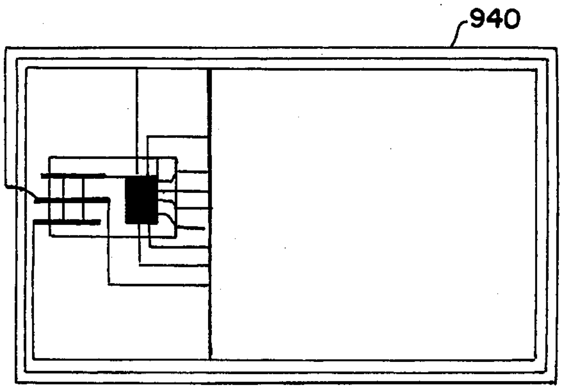

FIGS. 9A, 9B and 9C are pictorial diagrams of the leadframe structure involved in building the proximity key 500 as shown in FIGS. 5 and 6. In this structure the integrated circuit 910 is mounted by conventional means as a chip on a single customized conductive chip carrier lead frame 920 as shown in FIGS. 9A and 9B. A filter capacitor 960 and a tuning capacitor 980 may be mounted on and connected to the respective leads 912, 914 and 914, 916. In conventional integrated circuit fabrication the outer extensions of the leads 930 of the lead frame are then separated from the material of the rest of the lead frame to provide the connection legs of the integrated circuit. In the present invention, the perimeter 940 is not completely separated from the connection legs 916, 932. Rather, the perimeter 940 remains connected to the nodes labeled Coil 1, Coil 2, and Coil 3, L1 and L2 as shown in FIG. 6, after appropriate cuts are made about the lead frame, as shown in FIG. 9C.

The lead-frame structure as shown in FIG. 9C may be connected to other lead frames (not shown) located within the perimeter 940 and in the same plane thereof, with such other lead frames carrying additional integrated circuitry, as required. The assembly is then encapsulated in plastic laminae to form a credit-card type of structure. Additional laminae of high resistivity conductive plastic material may be incorporated into the laminated structure to form an electrostatic shield around the integrated circuitry and lead frames. In this way, the antenna necessary for remotely coupling the proximity key 500 to the security system is integrally formed as part of the lead frame to provide requisite circuitry and mechanical rigidity at the perimeter of the proximity key.

What is claimed is:

1. A security system for controlling ingress and egress through a plurality of locks, said security system comprising:

master controller means for providing central recording of activity in the security system and central program and data entry for controlling said system;

a plurality of subcontroller means for making decisions concerning ingress and egress through said plurality of locks, said subcontroller means being coupled to said master controller means to receive programs and data entered in said master controller means to report activity in the security system to the master controller means, said subcontroller means being also capable of independently making said ingress and egress decisions even if the coupling to the master controller is interrupted; and a plurality of terminal controller means coupled to each of the plurality of subcontroller means for accepting entry codes at each of said locks and opening and closing each of said locks under control of said subcontroller decisions, said terminal controllers being also capable of dependently opening and closing said locks if the coupling to their respective subcontrollers is interrupted.

2. A security system as in claim 1 further comprising electronic key means for entering entry codes into said plurality of terminal controller means.

3. A security system as in claim 2 wherein each entry code is arranged as a plurality of data words and less than all of said data words are transmitted from said electronic key means to said plurality of terminal controller means.

4. A security system as in claim 2 wherein the entry codes are arranged to provide a plurality of different access levels for ingress and egress through the plurality of locks.

5. A security system as in claim 2 wherein the entry codes are arranged to provide a plurality of different access times for ingress and egress through the plurality of locks.

6. A security system as in claim 1 further comprising:

a primary two-wire data bus for coupling the master controller means to the plurality of subcontroller means; and a secondary two-wire data bus for coupling each subcontroller means to that plurality of terminal controller means which are coupled to a given subcontroller means.

7. A security system as in claim 1 wherein the master controller means further comprises a clock means for recording and controlling the security system activity as a function of time.

8. A security system as in claim 1 comprising an electronic key for interacting with the terminal controller wherein said terminal controller includes means for supplying programming data, code data and power, said key comprising:

data means for receiving programming data, code data and power from the terminal controller; and storage means coupled to the data means for nonvolatilely storing the code data in response to the programming data when power is supplied from the terminal controller.

9. A security system as in claim 8 wherein an electronic key includes circuit means for producing a modulation signal having a plurality of subcycle intervals, each including a plural number of bit-time intervals with selected binary bits of first and second logic states occurring within said bit-time intervals to represent the data for transmission to the terminal controller, and having an addtional subcycle interval having substantially no binary bits of said data; and means for repetitively transmitting said modulation signal to the terminal controller for synchronizing operation therewith in response to the periodic recurrences of said additional subcycle intervals of the modulation signal.

10. A security system as in claim 1 comprising an electronic key for interacting with the terminal controller, comprising:

chip means for supplying data for use by the terminal controller; and carrier means mechanically supporting the chip means and electrically coupled thereto for serving as an antenna for transmitting data to a remotely located terminal controller.

* * * * *